United States Patent [19]

Barucchi et al.

[11] Patent Number: 5,392,401
[45] Date of Patent: Feb. 21, 1995

[54] SWITCHING SYSTEM FOR SIMULTANEOUSLY TRANSFERRING DATA BETWEEN DATA PROCESSING UNITS

[75] Inventors: Gerard Barucchi, Villeneuve Loubet; Jean Calvignac, La Gaude; Daniel Orsatti, Cagnes Sur Mer; Andre Tracol, Villeneuve Loubet, all of France

[73] Assignee: International Business Machines Corporation, Armonk, N.Y.

[21] Appl. No.: 5,425

[22] Filed: Jan. 21, 1993

Related U.S. Application Data

[63] Continuation of Ser. No. 479,139, Feb. 13, 1990, abandoned.

[30] Foreign Application Priority Data

Mar. 14, 1989 [EP] European Pat. Off. ............ 89480047

[51] Int. Cl.$^6$ ...................... G06F 13/00; G06F 13/14
[52] U.S. Cl. ............................ 395/200; 395/325; 364/229; 364/229.2; 364/229.4; 364/260; 364/DIG. 1
[58] Field of Search .................. 395/200, 325, 800; 364/260, 229.4, 229.2, 949.93, 929.1

[56] References Cited

U.S. PATENT DOCUMENTS

| | | | |
|---|---|---|---|
| 4,079,448 | 3/1978 | N'Guyen et al. | 364/200 |
| 4,373,183 | 2/1983 | Means et al. | 364/200 |
| 4,402,078 | 8/1983 | Athenes et al. | 370/66 |
| 4,503,497 | 3/1985 | Krygowski et al. | 364/200 |
| 4,543,627 | 9/1985 | Schwab | 364/200 |
| 4,631,661 | 12/1986 | Eibach et al. | 364/200 |
| 4,792,917 | 12/1988 | Takamatsu et al. | 364/900 |
| 4,821,174 | 4/1989 | Webb et al. | 364/200 |
| 4,912,632 | 3/1990 | Gach et al. | 364/200 |

OTHER PUBLICATIONS

Quatember, "Protocol Issues of the Configurational Management and the Resolution of the Contention Problem in a Large-Scale Crossbar Switch", May 1983, pp. 1-2.

Primary Examiner—Kevin A. Kriess
Assistant Examiner—Dennis M. Butler
Attorney, Agent, or Firm—Joscelyn G. Cockburn

[57] ABSTRACT

The system performs an optimized number of simultaneous transfers of data packets between pairs of units comprising an origin unit and a target unit selected among N data processing units (8). Each data processing unit comprises a set of outbound queues with one outbound queue associated with each one of the data processing units to which it may send data packets, for storing the data packets to be sent by the data processing unit to the data processing unit associated with said one outbound queue. The transfers are performed during a time burst $T_{i+1}$ by data switch 6 under control of switching control signals sent to data switch by the units on lines 16-1 to 16-N in response to control out signals generated by scheduler 4 during previous burst time $T_i$. The scheduler runs a selection algorithm which gives each unit an equal probability to be selected as origin unit in a given period.

12 Claims, 7 Drawing Sheets

SWITCHING SYSTEM FOR SIMULTANEOUSLY TRANSFERRING DATA BETWEEN DATA PROCESSING UNITS

This is a continuation of application Ser. No. 07/479,139, filed Feb. 13, 1990, now abandoned.

DESCRIPTION OF THE INVENTION

1. Field of the Invention

The present invention relates to a switching system, for performing an optimized number of simultaneous transfers of data packets between data processing units.

2. Background Art

There are several techniques for transferring data packets between data processing units. For example, the units may be connected to a conventional time division multiplex bus. One drawback of this technique is that a given amount of bandwidth is reserved during the connections of two units, even if there is no transfer of data between the units to which the given bandwidth amount has been allocated.

Another technique which allows transfers of data between data processing units to be performed simultaneously, is described in U.S. Pat. No. 4,623,996. The packet switching node which is described in this patent comprises N input ports and M output ports. A queue set is associated to each input port, each set comprising M queues, with one queue associated to one output port. Each input port is connected to a queue selector which causes the received packets to be stored in the queue associated to the output port to which the packets have to be routed. The queues of each queue set are connected to different output arbitrators which arbitrate among the data packets that are stored in the queues of each set that contend for the same output port. Since this switching node comprises N.M busses connecting the queues to the output arbitrators, this technique becomes impracticable when the number of input and output ports is high.

OBJECTS OF THE INVENTION

An object of the present invention is to provide a system which allows an optimized number of simultaneous transfers between data processing units to be performed.

Another object of the present invention is to provide such a system which gives the data processing units an equal probability of being serviced.

Another object of the present invention is to provide such a system which improves the performance of the data transfers.

SUMMARY OF THE INVENTION

The system according to the present invention allows transfers of data packets between pairs of units comprising an origin unit and a target unit selected among N data processing units, to be performed. Each data processing unit comprises a set of outbound queues with one outbound queue associated with each one of the data processing units to which it may send data packets, for storing the data packets to be sent by the data processing unit to the data processing unit associated with said one outbound queue. The system is characterized in that it comprises:

clocking means providing timing signals for defining burst times Ti of fixed durations, centralized selecting means active during each burst time Ti for conditionally selecting different pairs of units as a function of transfer requests received from the N data processing units, said selecting means comprising sending means for sending the address of the selected target unit of each pair to the origin unit of the pair data switching means which are connected to each one of the N data processing units, through a receive data bus and a transmit data bus and are responsive to the addresses of the selected target units received from the selected origin unit to connect, during the next burst time Ti+k, k being an integer higher than on equal to 1, the transmit data bus of the origin unit to the receive data bus of the target unit of each pair selected during the burst time Ti, whereby fixed size bursts of data packets are simultaneously transferred from the outbound queues in the selected origin units to the selected target units.

In a preferred embodiment of the invention, the burst times Ti comprise at least N cycles, and the centralized selecting means are active during the N first cycles of each burst time Ti for conditionally selecting a pair of units during each cycle 1 to N, firstly, as a function of transfer requests received from the N data processing units, with units selected as origin and target units during a given cycle of a predetermined burst time not being selected as origin and target units during the other cycles of the same predetermined burst time, secondly, during the first cycle, as a function of the pair of units selected during the first cycle of the previous burst time Ti-N, the pair of units selected during said last named first cycle not being selected during said first named first cycle unless no other pair may be selected, thirdly, during the second to Nth cycles, as a function of the pairs of units selected during the third to Nth and first cycles of the next preceding burst time, respectively, the pairs of units selected during the third to Nth and first cycles of the next preceding burst time not being selected during the second to Nth cycles of the current burst time Ti, respectively, unless no other unit may be selected.

The centralized selecting means comprise:

first storing means receiving the transfer requests in the form of an information indicative of empty to not empty status changes of the outbound queues from the N data processing units and comprising N sets (rows 1 to 4) of N storing positions, each one of said storing positions being assigned to a given data processing unit, the information indicative of the empty or not empty status, as the case may be, of the outbound queues associated with a given unit in the N units being stored in one set of storing positions, second storing means for storing the addresses of the units of the pairs which are selected during each cycle of the burst times, addressing means responsive to the timing signals from the clocking means for successively addressing a set of the storing positions in the first storing means during the successive cycles 1 to N of a current burst time Ti and addressing the second storing means so as to get the addresses of the pairs selected in the cycles 1 of the burst time Ti-4 and in the cycles 3 to N and 1 of the next preceding burst time Ti-1, selection processing means which are responsive to the information read from the first and second storing means when addressed by the addressing means for determining the addresses of the origin and target units of the pair which may be conditionally selected during each cycle 1 to N of the current burst time Ti and for providing these addresses to the sending means.

The first storing means comprise a matrix having N rows and N columns, the N rows of the matrix constituting the N sets of N storing positions, so that at each cycle 1 to N one row of the first matrix is addressed by the addressing means and the content of the addressed row is read and provided to the selection processing means, the address of the row being indicative of the target unit of the pair, the origin unit of which will be conditionally selected by the selection processing means.

DETAILED DESCRIPTION OF THE INVENTION

Figure 1:
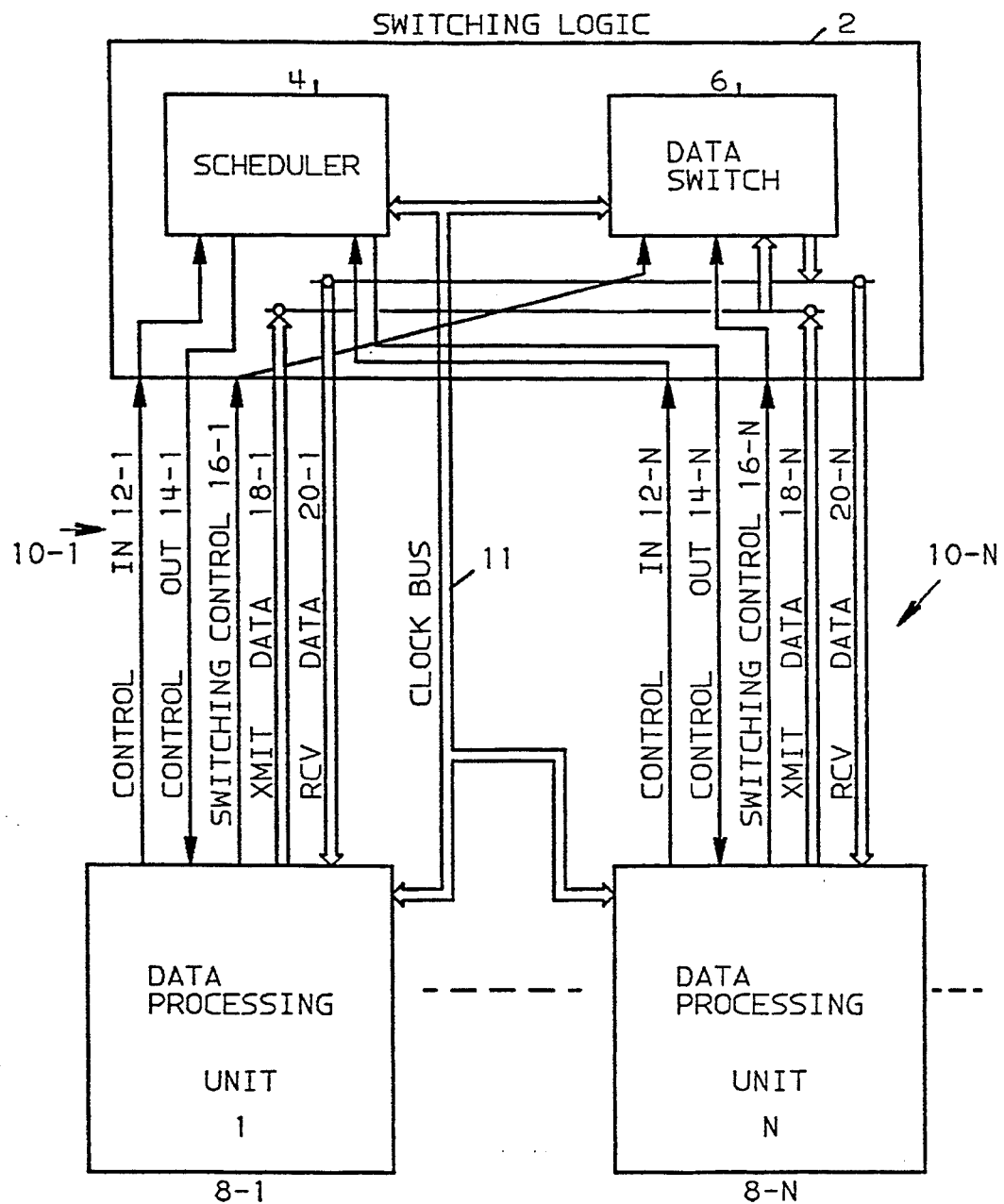
FIG. 1 represents the block diagram of the system according to the present invention.

As shown in FIG. 1, the main part of the system according to the subject invention is a switching logic circuit 2, which comprises a scheduler 4 and a data switch arrangement 6.

The switching logic circuit 2 is connected to N data processing units which are referenced as unit 8-1 to 8-N through busses 10-1 to 10-N, respectively.

Each one of the busses 10-1 to 10-N, comprises three wires used to carry serial control signals, namely a CONTROL IN wire 12-1 to 12-N, a CONTROL OUT wire 14-1 to 14-N and a SWITCHING CONTROL wire 16-1 to 16-N. The CONTROL IN and CONTROL OUT wires 12-1 to 12-N of busses 10-1 to 10-N are connected to the scheduler 4 and the SWITCHING CONTROL wires 16-1 to 16-N are connected to the data switch arrangement 6.

Busses 10-1 to 10-N also comprise XMIT DATA wires 18-1 to 18-N and RCV DATA wires 20-1 to 20-N, which are respectively used to carry data bytes between the data processing units 8-1 to 8-N and the data switch 6, in parallel. In addition, scheduler 4 sends to the data processing units 8 and to data switch 6 and receives from the data processing unit 8 clock signals through a clock bus 11 to time the data transfer operations.

According to the present invention, the stream of information to be transferred between the data processing units is chopped in bursts having a fixed length. These bursts are synchronously exchanged in one burst time, i.e. for these bursts, the transmission starts and ends at the same time.

The burst time is equal to the time required to transfer a data burst.

Scheduler 4 selects pairs of units comprising one transmitting unit (origin unit) and the corresponding one receiving unit (target unit) among the N data processing units 8-1 to 8-N. The selection mechanism which will be explained later on optimizes the overall exchange capability of the switching logic 2, by selecting the maximum number of different pairs of data processing units during each burst time. According to this selection mechanism, the units may be selected for transmitting, for receiving or for both transmitting and receiving.

Briefly, during the burst time Ti, simultaneous transfers are performed between the data processing units of the pairs selected during a previous burst time Ti-k, through their associated RCV and XMIT DATA wires, 20 and 18, and scheduler 4 determines the pairs of data processing units which will be selected for performing the data transfers during the next burst time Ti+1. The selection is performed under the CONTROL IN signals provided by the data processing units on wires 12-1 and 12-N. In addition, in a preferred embodiment of the invention, the selection depends upon the transfers performed during the previous burst times, so as to give each data processing units an equal probability of being selected.

In response to the CONTROL OUT signals received on their CONTROL OUT wires 14-1 to 14-N during a burst time Ti-k, the data processing units 8-1 to 8-N generate SWITCHING CONTROL signals on the SWITCHING CONTROL wires 16-1 to 16-N, which are provided to data switch 6 so as to connect the XMIT and RCV DATA busses 18-1 to 18-N and 20-1 to 20-N in accordance with the pairs of units selected by scheduler 4, in order to perform the transfers during next burst time Ti.

So, during any burst time a plurality of data bytes are transferred between selected pairs of data processing units.

Any unit may be receiving data bytes from another unit, transmitting data bytes to another unit or both transmitting and receiving.

The value of k depends upon the specific implementation of the invention. In a preferred embodiment, of the invention the control out and switching control signals are serially transmitted to reduce the number of wires. In such an embodiment k is chosen equal to 2.

For the sake of clarity, the system of the present invention will be described in details assuming that it comprises four data processing units 8-1 to M called A, B, C and D. From this simplified description, it will be easy for the man skilled in the art to implement such a system with a different number of data processing units.

Figure 2:
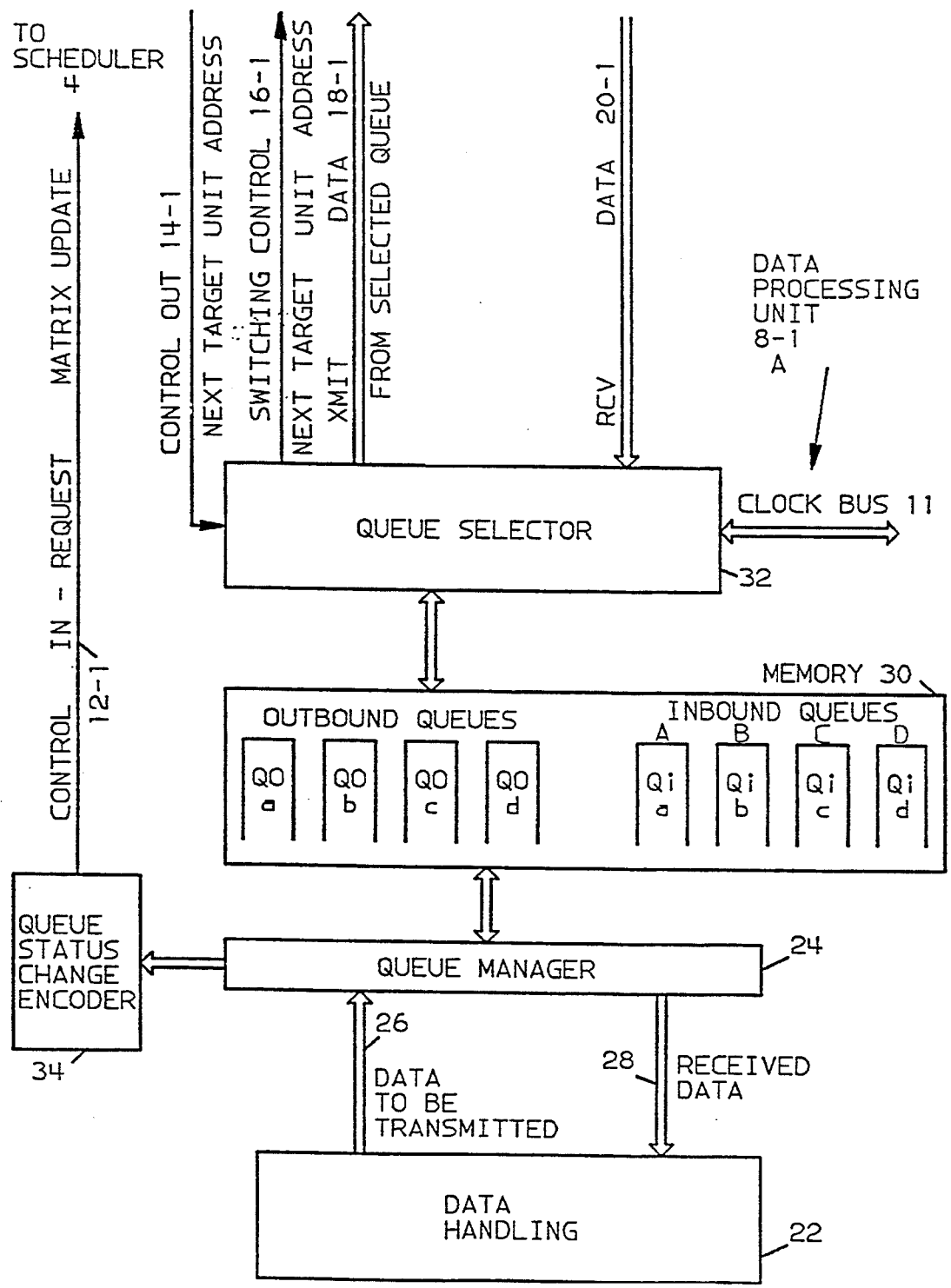
FIG. 2 represents the block diagram of a data processing unit.

FIG. 2 represents the means which are required in the data processing units A to D, to implement the system according to the present invention.

Each unit comprises conventional data handling means 22 which process the data received by the unit or to be transmitted by the unit.

The data to be transmitted are provided to a queue manager device 24 through a bus 26 and the received data are provided from queue manager device 24 to the data handling means 22 through a bus 28.

The data to be transmitted and the received data are stored in memory 30. Each unit considers itself and the other data processing units as potential targets, to which it may transmit data bytes. So, memory 30 houses one queue towards each unit. These queues are called the outbound queues.

So, since it is assumed that there are four data processing units A, B, C, and D there are four outbound queues QOa, QOb, QOc and QOd. For example, in unit A, the outbound queue QOa is used by unit A to enqueue the data to be transmitted to unit A, for wrap test purposes. The outbound queue QOb is used by unit A to enqueue the data to be transmitted to unit B, the outbound QOc is used by unit A to enqueue the data to be transmitted to unit C and the outbound queue QOd is used by unit A to enqueue the data to be transmitted to unit D.

In the preferred embodiment of the present invention, there is an inbound queue QIa, QIb, QIc and QId per unit A, B, C and D respectively, which is used to enqueue the data received from the units A, B, C, and D through wires 20-1 of bus 10-1 and under control of a queue selector device 32. The data read from inbound queues are sent to the data handling means 22 under control of the queue manager 24.

As far as the outbound queues are concerned, the queue manager device 24 controls the storage operation of the data in the outbound queues selected as a function of the target data processing units to which the data are addressed. The address of the target data processing units are contained in the header portion of the data messages, as is conventional.

The queue manager device 24 provides the indications of the outbound queue status to a queue status change encoder 34. This information is used to generate the CONTROL IN signals on wires 12-1 to 12-4, to update a request matrix 36 (shown in FIG. 3) in scheduler 4.

For each outbound queue, the CONTROL IN signals carry the queue status information which comprises a status bit indicating whether the outbound queue becomes empty or not empty, and the corresponding queue designation. These signals may be sent in series through only one wire, since the updating of the request matrix has not to be done as soon as a status change is detected.

The queue selector 32 receives the CONTROL OUT signals from wire 14-1 and depending upon the outbound queue designation which is carried by these signals causes the content of a selected outbound queue to be transmitted through wires 18-1 to the data switch 6 together with the switching control signals, as will be described in details in reference to FIG. 3.

Also, queue selector 32 routes the received data from bus 20-1 to be stored into an inbound queue which is selected through the inbound queue designation which is carried by the CONTROL IN signals.

In other embodiments of the present invention, a single inbound queue may be used to enqueue all the data bursts received from the other units. In such an embodiment, there is no need to send the inbound queue designation in the CONTROL IN signals.

Figure 3:
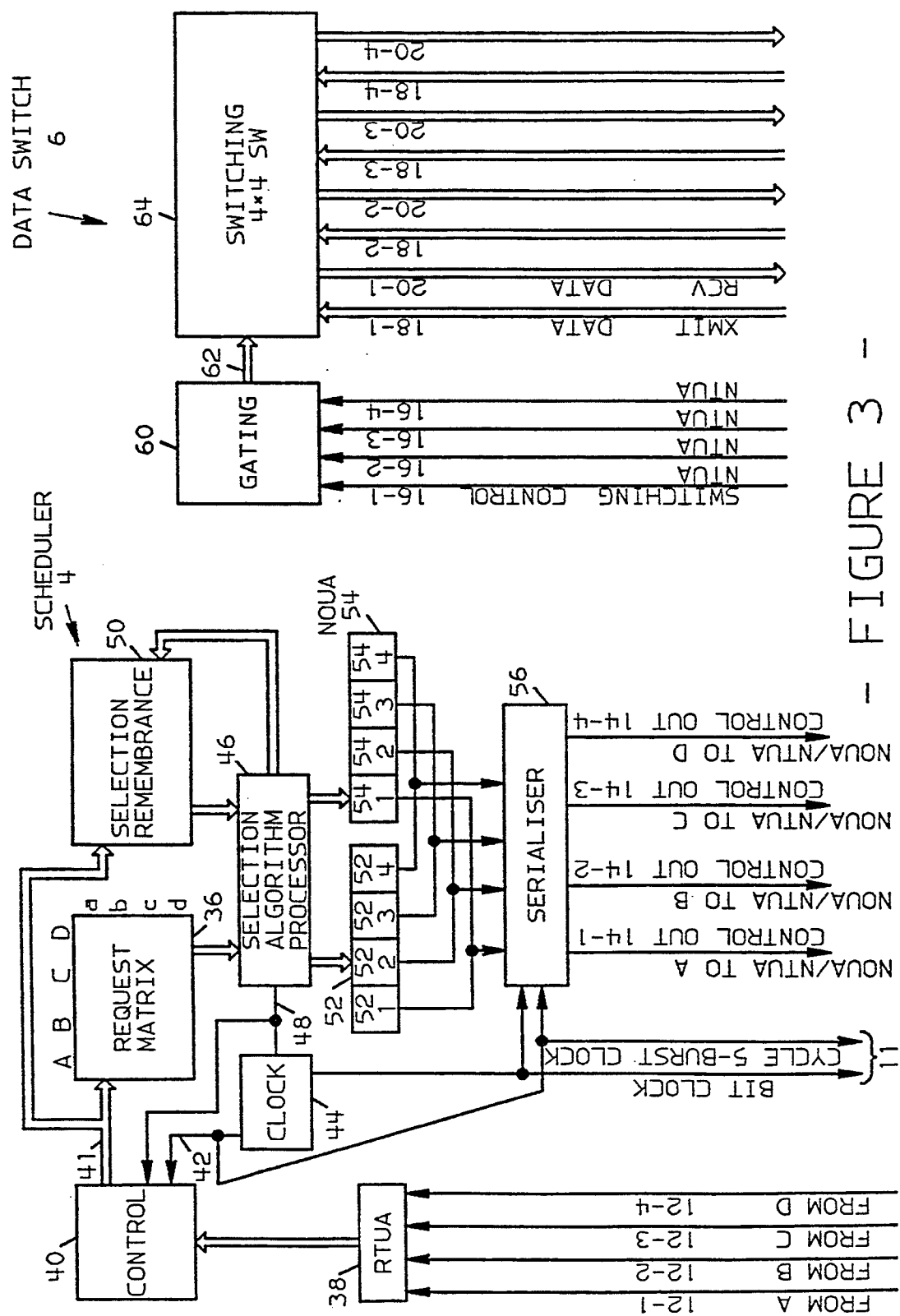
FIG. 3 represents the switching logic 2 which is a part of the system shown in FIG. 1.

FIG. 3 represents the scheduler 4 and the data switch 6 which constitutes the switching logic 2.

The scheduler 4 comprises the request matrix 36 which is used to store an indication of the status of the outbound queues of each data processing unit. In the preferred embodiment of the present invention, this matrix comprises four rows and four columns. The element Tij, in row i and column j represents the status of the outbound queue toward unit i in unit j. For example a "1" in the element T23 indicates that the outbound queue Qb in unit C is not empty. This means that unit C has a transfer request toward unit B.

The request matrix has the following configuration:

| DATA PROCESSING UNITS | | | | | | |
| --- | --- | --- | --- | --- | --- | --- |
| | | A | B | C | D | |
| OUTBOUND QUEUES | Qa | 0 | 1 | 0 | 1 | row 1 |
| | Qb | 0 | 0 | 1 | 0 | row 2 |
| | Qc | 1 | 0 | 0 | 1 | row 3 |
| | Qd | 0 | 0 | 1 | 0 | row 4 |

A matrix having this configuration means that unit A has data to be transmitted to C, unit B has data to be transmitted to A, unit C has data to be transmitted to B and to D and unit D has data to be transmitted to A and C.

The information in request matrix 36 which may be implemented in a memory, is generated from the CONTROL IN signals received from wires 12-1, 12-2, 12-3 and 12-4 and stored in request target unit address register RTUA 38, this register has four storage positions, with one position dedicated to each unit and stores the status changes of the outbound queues in the corresponding unit.

This information is provided to a control circuit 40 which operates under control of clock timing signals provided on the output line 42 of a clock circuit 44, so as to update the content of the rows of the request matrix when not used by the scheduler 4.

Clock circuit 44 determines the sequencing of the operations performed by scheduler 4 during each burst time T. In the preferred embodiment of the invention, the burst time Ti is divided in at least N+1 cycles i.e. five cycles: cycle 1, cycle 2, cycle 3, cycle 4 and cycle 5 in the illustrated embodiment of the invention. A selection algorithm processor 46 operates during the N first cycles i.e. cycles 1 to 4 of each burst time, to determine the pair of units, which will be selected during the next burst time Ti to transfer data bursts. Timing signals determining the cycle 1 to 4 periods are provided to the selection algorithm processor 46 and to control circuit 40 through bus 48. Timing signals determining the cycle 5 period are provided on line 42. The address of the selected units are sent during time Ti+1 to control the transfers during time Ti+2.

At each cycle 1 to 4 of a burst time, a row of the request matrix is read and provided to the selection algorithm processor 46, a transfer request is selected as a function of the row pattern and of a selection remembrance pattern which is stored in a selection remembrance matrix 50, as will be described later on. At each cycle, the addresses of the units of a selected pair of units are stored in a next target unit address NTUA register 52 and in next origin unit address NOUA 54. These registers 52 and 54 have four positions 52-1 to 52-4 and 54-1 to 54-4. One position is assigned to each unit.

For example, the position 1 of registers 52 and 54 is assigned to unit A, the position 2 is assigned to unit B, the position 3 is assigned to unit C and the position 4 is assigned to unit D, as schematically represented in FIG. 3. At each cycle, a pair of units comprising an origin unit and a target unit may be selected. Assuming the selected origin unit is A and the target unit is B, the address of unit B is stored in position 1 assigned to unit A in register NTUA 52 and the address of unit A is stored in position 2 assigned to unit B in register NOUA 54.

During the last cycle 5 of the burst times, the content of registers 52 and 54 are provided to a serializer device 56.

The target and origin unit addresses contained in the positions 1 of registers 52 and 54 are serialized under control of bit clock signals on one line of bus 11 and sent to unit A through wire 14-1. The target and origin unit addresses contained in the positions 2 of registers 52 and 54 are serialized and sent to unit B through wire 14-2. The target and origin addresses contained in the positions 3 of registers 52 and 54 are serialized and sent to unit C through wire 14-3 and the target and origin addresses contained in the positions 4 of registers 52 and 54 are serialized and sent to unit D through wire 14-4.

So, each unit receives the target address of the unit to which it will have to send data and the origin address of the unit from which it will receive data.

During the next burst time, the units in response to the target address information contained in the CONTROL OUT signals they have received from wires 14-1 to 14-4 and the cycle 5 timing signal on line 42, provide the appropriate SWITCHING CONTROL signals on wires 16-1 to 16-4, to a gating logic circuit 60. Gating logic circuit 60 generates appropriate gating signals on bus 62 in response to the SWITCHING CONTROL signals to close appropriate logic switches in a switching arrangement 64 which may comprise a logic AND-/OR circuit arrangement, to allow the selected transfers to be performed during time Ti+2. The queue selector 32 is responsive to the origin address contained in the CONTROL OUT signals to gate the received data into the inbound queues corresponding to the origin unit.

Figure 4:
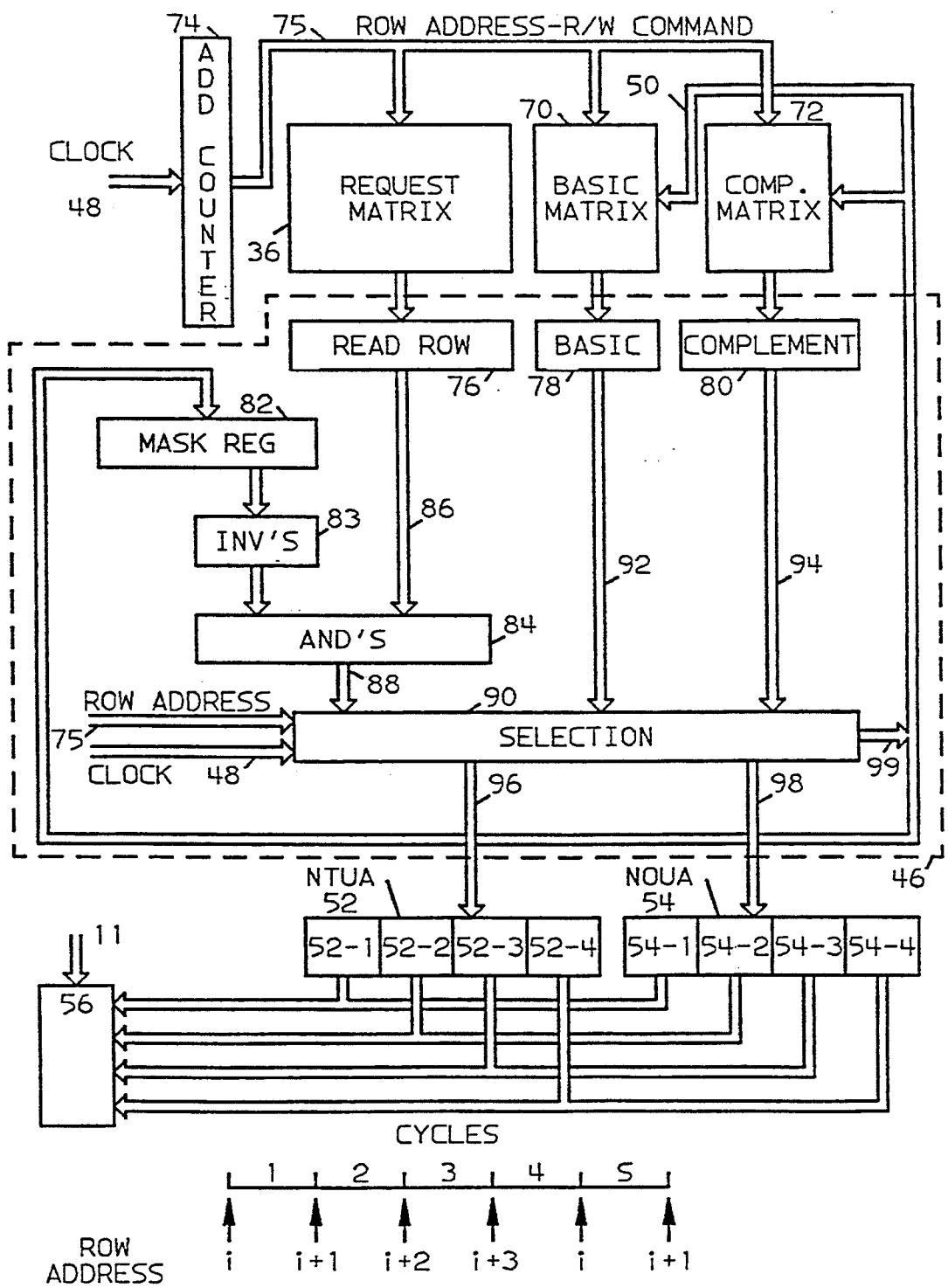
FIG. 4 represents the selection algorithm processor 46 which is a part of the scheduler 4 in the switching logic 2.

It will now be described the selection method which is implemented by the selection algorithm processor 46. FIG. 4 represents in details the selection algorithm processor 46.

The selection is performed by selection algorithm processor 46. It processes a bit pattern which is derived from the bit pattern stored in a row of the request matrix so that said bit pattern comprises as many bits as there are data processing units (i.e. four in the described example) so as to select the first "1" encountered after a position given by another four bit pattern which is provided by the selection remembrance matrix 50. The selected "1" provides an indication of the origin unit and target unit of the pair which is selected when the row is processed.

The selection remembrance matrix 50 comprises two matrices, the first one is called the BASIC matrix 70 and the second one is called the COMPLEMENTARY matrix 72. These matrices have four rows: row 1, row 2, row 3 and row 4 corresponding to the row 1, 2, 3 and 4 of the request matrix 36.

The selection process takes place during cycles 1 to 4 of each burst time. At each cycle, address counter 74 addresses matrix 36 and COMPLEMENTARY matrix 72. BASIC matrix 70 is only addressed at cycle 1.

The bit pattern read from request matrix 36 is stored in a READ ROW register 76. At cycle 1, the information read from the BASIC matrix 70 is stored in a BASIC register 78 and at cycles 2 to 4, the information read from COMPLEMENTARY matrix 72 is stored in a COMPLEMENTARY register 80.

A MASK register 82 stores a masking pattern Pm which comprises four bits (assuming the number of data processing units is equal to four). The masking pattern Pm is provided through an inverter arrangement 83 to a four-AND gate arrangement 84. The content of register 76 is provided through bus 86 to the AND gate arrangement 84, which thus provides the bit pattern stored in register 76 modified by the content of the mask register 82, on its output bus 88.

The selection algorithm processor 46 comprises a selection device 90, which is connected to the output bus 88 of AND gate arrangement 84, to the output bus 92 of BASIC register 78 and to the output bus 94 of COMPLEMENTARY register 80. It also receives control information, namely the clock signals from bus 48 setting the cycles 1 to 4 and the row address information provided by address counter 74 on bus 75.

At the end of each cycle 1 to 4 the content of COMPLEMENTARY matrix 72 and of MASK register 82 is updated as will be described later. The content of BASIC matrix is only updated at the end of cycle 1.

The selection device 90 provides the NTUA and NOUA information to be written into the four positions of registers 52 and 54 on its output bus 96 and 98, respectively.

It also provides on a bus 99 the updating information to be used to update the content of MASK register 82 and of the matrices 70 and 72.

The operation of the selection algorithm processor 46 will now be described in reference to tables 1 and 2, which illustrate which pairs of units comprising an origin unit and a target unit are selected by the selection process run during three burst times 1, 2, 3. Table 1 illustrates the information which is processed at each cycle, to process a row of the request matrix illustrated in table 2. Table 2 also illustrates the content of the BASIC and COMPLEMENTARY matrices as it is updated at the end of each cycle. For the sake of clarity, these illustrations do not take into account a possible updating of the request matrix. Should this happen, the new request matrix will be processed in the same way as the initial matrix.

In table 1 there are two values for the mask pattern Pm register 82 and the patterns stored in the BASIC and COMPLEMENTARY registers 78 and 80. The upper value indicates the value used to perform the selection and the lower value indicates the updated value at the end of the cycle.

The Pm mask pattern is built all along the algorithm run. It is blank at the beginning of each burst time and it changes after every row processing. The mask pattern is reset to zero at the end of the burst time.

The masking rule is the following. When a row I is processed, and a request J to I is selected, (with I, J=A, B, C or D) the source J needs to be masked during the processing of the next rows so as not to be selected again. Thus a "1" is written in the position of the mask register 82 which corresponds to the selected origin unit. In the illustration shown in table 1, it is assumed that the left most position of register 82 corresponds to unit A and the right most position corresponds to unit D.

The selection of a pair of units is performed for each row so that the same unit may not be selected as target unit during the successive cycles 1 to 4 of a predetermined burst time. The selection is performed by detecting the first 1 in the masked row from a position which is determined by the content of the corresponding row of the BASIC matrix 70 at the beginning of the cycle 1 and by the content of the corresponding row of the COMPLEMENTARY matrix 72 at the beginning of the cycles 2 to 4. When a 1 is selected the mask pattern is updated as well as the content of the COMPLEMENTARY and BASIC matrices, as shown in the tables 1 and 2.

TABLE 1

| | CYCLE | READ ROW 78 | MASK 82 | MASKED ROW 88 | COMP 80 | BASIC 78 | SELECTION |
|---|---|---|---|---|---|---|---|
| BURST TIME 1 | 1 | ROW 2 0010 ↓ | 0000 ↓ 0010 | 0010 | ↓ 0010 | 0000 ↓ 0010 | C -> B |
| | 2 | ROW 3 0010 1001 ↓ 1010 | 0010 ↓ 1001 | 1001 | 0000 ↓ 1000 | | A -> C |
| | 3 | ROW 4 0010 ↓ 1010 | 1010 ↓ 0000 | 0000 | 0000 ↓ 0000 | | No selection |
| | 4 | ROW 1 0101 ↓ 0000 | 1010 ↓ 0101 | 0101 | 0010 ↓ 0001 | | D -> A |
| BURST TIME 2 | 1 | ROW 3 1001 ↓ 1010 | 0000 ↓ 1000 0010 | 1001 | ↓ 1000 | 0000 ↓ 1000 | A -> C |
| | 2 | ROW 4 0010 ↓ 1010 | 1000 ↓ 0010 | 0010 | 0000 ↓ 0010 | | C -> D |
| | 3 | ROW 1 0101 ↓ 1110 | 1010 ↓ 0101 | 0101 | 0001 ↓ 0100 | | B -> A |
| | 4 | ROW 2 0010 ↓ 0000 | 1110 ↓ 0101 | 0101 | 0010 ↓ 0010 | | No selection |

| | CYCLE | READ ROW 78 | MASK 82 | MASKED ROW 88 | COMP 80 | BASIC 78 | SELECTION 94-92 |
|---|---|---|---|---|---|---|---|
| BURST TIME 3 | 1 | ROW 4 0010 ↓ 0010 | 0000 ↓ 0010 | 0010 | ↓ 0010 | 0000 ↓ 0010 | C -> D |
| | 2 | ROW 1 0101 ↓ 0011 | 0010 ↓ 0101 | 0101 | 0100 ↓ 0001 | | D -> A |
| | 3 | ROW 2 0010 ↓ 0011 | 0011 ↓ 0000 | 0000 | 0010 ↓ 0010 | | No selection |
| | 4 | ROW 3 1001 ↓ 0000 | 0011 ↓ 1000 | 1000 | 1000 ↓ 1000 | | A -> C |

TABLE 2
INITIAL STATE

| | | REQUEST MATRIX | | | | BASIC MATRIX | | | | COMPLEMENTARY MATRIX | | | |
|---|---|---|---|---|---|---|---|---|---|---|---|---|---|
| | | A | B | C | D | | | | | | | | |
| ROW 1 | a | 0 | 1 | 0 | 1 | 0 | 0 | 1 | 0 | 0 | 0 | 1 | 0 |
| 2 | b | 0 | 0 | 1 | 0 | 0 | 0 | 0 | 0 | 0 | 0 | 0 | 0 |
| 3 | c | 1 | 0 | 0 | 1 | 0 | 0 | 0 | 0 | 0 | 0 | 0 | 0 |
| 4 | d | 0 | 0 | 1 | 0 | 0 | 0 | 0 | 0 | 0 | 0 | 0 | 0 |

| B | BASIC | COMP | COMP | COMP | COMP |
|---|---|---|---|---|---|
| U | 0010 | 0010 | 0010 | 0010 | 0001 |
| R | 0010 | 0010 | 0010 | 0010 | 0010 |
| S | 0000 | 0000 | 1000 | 1000 | 1000 |
| T | 0000 | 0000 | 0000 | 0000 | 0000 |

| 1 | AFTER CYCLE 1 | AFTER CYCLE 2 | AFTER CYCLE 3 | AFTER CYCLE 4 |
|---|---|---|---|---|

| | 1 | 2 | 3 | 4 | | 1 | 2 | 3 | 4 | |
|---|---|---|---|---|---|---|---|---|---|---|
| NOUA REG.54 | D | C | A | | | C | | B | A | NTUA REG 52 |

| B | BASIC | COMP | COMP | COMP | COMP |
|---|---|---|---|---|---|
| U | 0010 | 0001 | 0001 | 0100 | 0100 |
| R | 0010 | 0010 | 0010 | 0010 | 0010 |
| S | 1000 | 1000 | 1000 | 1000 | 1000 |

TABLE 2-continued
INITIAL STATE

| T | 0000 | 0000 | 0010 | 0010 | 0010 |
|---|---|---|---|---|---|

| 2 | AFTER CYCLE 1 | AFTER CYCLE 2 | AFTER CYCLE 3 | AFTER CYCLE 4 |
|---|---|---|---|---|

| | 1 | 2 | 3 | 4 | | 1 | 2 | 3 | 4 | |
|---|---|---|---|---|---|---|---|---|---|---|
| NOUA REG.54 | B | | A | C | | C | A | D | | NTUA REG 52 |

| B | BASIC | COMP | COMP | COMP | COMP |
|---|---|---|---|---|---|
| U | 0010 | 0100 | 0001 | 0001 | 0001 |
| R | 0010 | 0010 | 0010 | 0010 | 0010 |
| S | 1000 | 1000 | 1000 | 1000 | 1000 |
| T | 0010 | 0010 | 0010 | 0010 | 0010 |

| 3 | AFTER CYCLE 1 | AFTER CYCLE 2 | AFTER CYCLE 3 | AFTER CYCLE 4 |
|---|---|---|---|---|

| | 1 | 2 | 3 | 4 | | 1 | 2 | 3 | 4 | |
|---|---|---|---|---|---|---|---|---|---|---|
| NOUA REG.54 | D | | A | C | | C | | D | A | NTUA REG 52 |

The BASIC matrix 70 is only used at cycle 1 of a burst, providing the selection algorithm processor 46 with the selection pattern used for performing the selection of a pair of units when the first row i is processed. Each row i of the BASIC matrix 70 contains an indication of the origin unit which was selected the last time the row i had been processed as first row, that is four burst times before.

For the sake of clarity, in tables 1 and 2, the BASIC and COMPLEMENTARY matrix rows comprise four elements, each element corresponding to one unit and the left most element corresponding to unit A and the right most element corresponding to unit D. However, the content of the BASIC and COMPLEMENTARY matrices may be encoded, and decoded into a N-bit pattern (N being the number of unit) comprising no more than one 1 which is stored into registers 78 and 80.

The new origin unit selected as a result of the current algorithm run is saved in both the BASIC and COMPLEMENTARY matrices 70 and 72 as illustrated in tables 1 and 2. If no origin unit is selected the content of row j is kept unchanged in both matrices.

The BASIC matrix guarantees that a request in a row of matrix 36 is served at least every 4.R bursts, R being the number of requests set in the considered row. In the worst case R is equal to four.

Then at cycles 2 to 4, the selection process is performed using the content of the complementary matrix 72.

The COMPLEMENTARY matrix 72 is used for the processing of all the request matrix rows except the first one. It provides the selection algorithm processor 46 with the selection pattern read from the COMPLEMENTARY matrix row.

When a row k is processed, the row k in the COMPLEMENTARY matrix 72 is provided to processor 46. Its content is the memorization of the selected origin unit during the process of this row, that is at the next preceding burst time.

If no request can be selected, the content of the COMPLEMENTARY matrix 72 is kept unchanged. The BASIC matrix is not updated when the COMPLEMENTARY matrix is used. The purpose of the COMPLEMENTARY matrix is to share the traffic towards a given target unit as the selection of a new origin unit starts at the position following the last selected origin unit.

In a preferred embodiment of the invention, the three matrices are implemented as shift registers. The request matrix 36 moves 5 times during each burst time: during cycles 1 to 4 to process the four rows and during cycle 5 to increment the row number by 1. As shown in Table 1, Row 2 is the first row which is processed at cycle 1 of burst time 1, Row 3 is the first row which is processed at cycle 1 of burst time 2 and Row 4 is the first row which is processed at cycle 1 of burst time 3.

The COMPLEMENTARY matrix 72 is shifted in synchronism with the request matrix 36 and the BASIC matrix is shifted Only one time per burst time at cycle 1.

Figure 5:
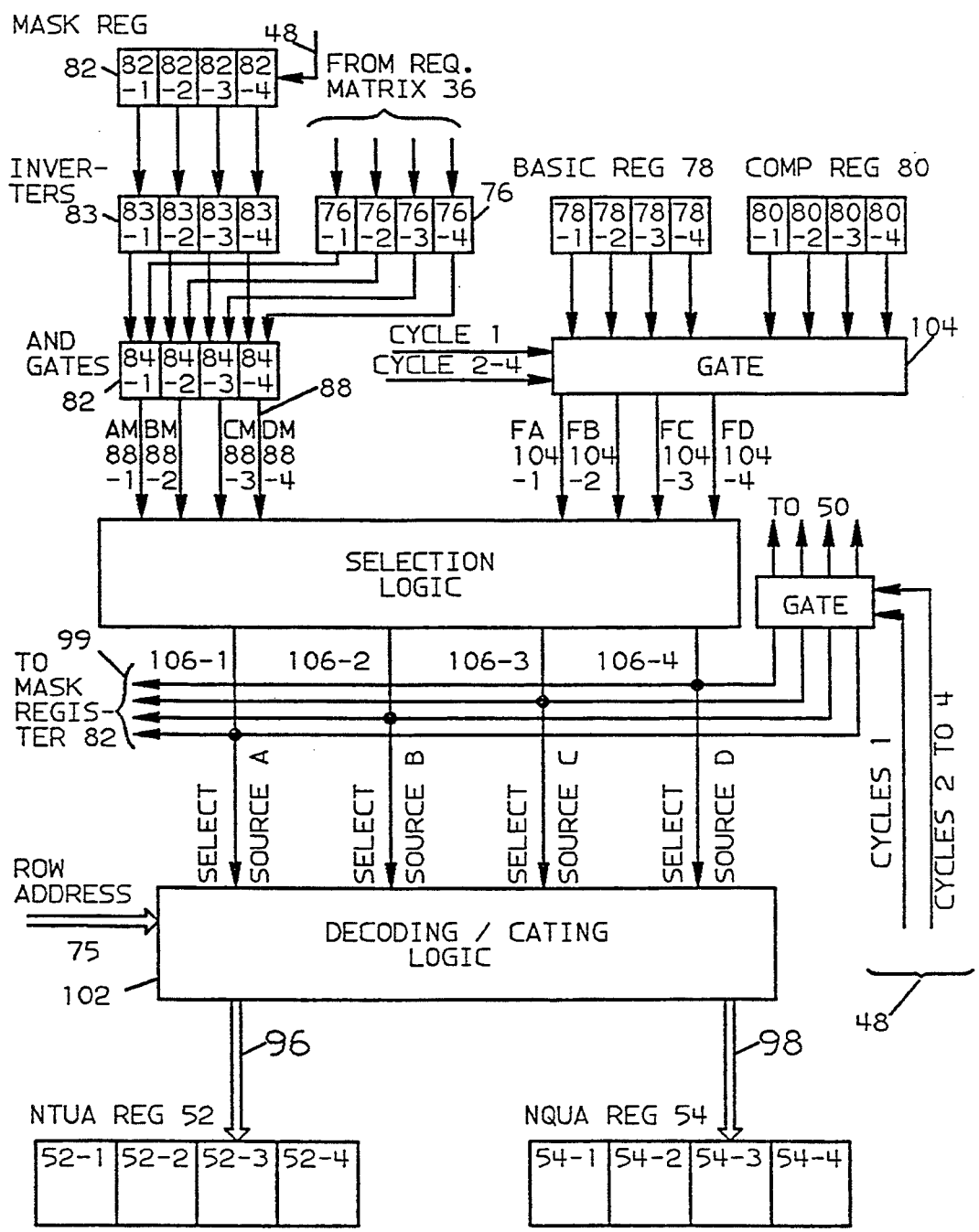
FIG. 5 represents the selection logic device 90 which is a part of the selection algorithm processor 46.

As shown in FIG. 5, the selection device 90 comprises two logic circuits, namely a selection logic circuit 100 and a decoding and gating logic circuit 102.

The selection logic circuit 100 receives the masked row bit pattern AM, BM, CM and DM generated on the output lines 88-1 to 88-4 of AND gates 84-1 to 84-4 of AND gate arrangement 84.

AND gates 84-1 to 84-4 receive the bit pattern stored in the four stages 76-1 to 76-4 of ROW register 76 and the mask pattern stored in the four stages 82-1 to 82-4 of MASK register 82, inverted by the inverters 83-1 to 83-4 of inverter arrangement 83.

Thus, the bit pattern AM, BM, CM and DM is the masked row pattern.

The BASIC and COMPLEMENTARY registers 78 and 80 comprise four stages 78-1 to 78-4 and 80-1 to 80-4.

During the cycle 1, a gate 104 provides the content of BASIC register 78 on its output lines 104-1 to 104-4, and during the cycles 2 to 4, gate 104 provides the content of the COMPLEMENTARY register 80 on its output lines 104-1 to 104-4.

The bit pattern on lines 104-1 to 104-4 is referenced by FA, FB, FC and FD.

The selection logic circuit 100 provides an active signal on one of its output lines 106-1 to 106-4 which indicates which unit A, B, C, or D is selected as origin unit when a row is processed.

To perform this function, selection logic circuit 100 is comprised of AND, OR and INVERTER circuits which activate the adequate output line among lines 106-1 to 106-4.

SELECT SOURCE A signal on line 106-1 is active when the following logic function is equal to 1:

$$AM.(\overline{FA}.\overline{BM}.\overline{CM}\;\overline{DM}+FB.\overline{CM}.\overline{DM}+FC.\overline{DM}+FD+\overline{FA}.\overline{FB}.\overline{FC}.\overline{FD})$$

SELECT SOURCE B signal on line 106-2 is active when the following logic function is equal to 1:

$$BM.(\overline{FA}+FB.\overline{CM}.\overline{DM}.\overline{AM}+FC.\overline{DM}.\overline{AM}.+\overline{AM}.(FD+\overline{FA}.\overline{FB}.\overline{FC}.\overline{FD}))$$

SELECT SOURCE C signal on line 106-3 is active when the following logic function is equal to 1:

$$CM.(FA.\overline{AM}.\overline{BM}+FB+FC.\overline{DM}.\overline{AM}.\overline{BM}+\overline{AM}.\overline{BM}.(FD+\overline{FA}.\overline{FB}.\overline{FC}.\overline{FD}))$$

SELECT SOURCE D signal on line 106-4 is active when the following logic function is equal to 1:

$$DM.(FA.\overline{AM}.\overline{BM}.\overline{CM}+FB.\overline{CM}+FC+\overline{AM}.\overline{BM}.\overline{CM}(FD+\overline{FA}.\overline{FB}.\overline{FC}.\overline{FD}))$$

The "." sign represents the AND operator, the "+" sign represents the OR operator and the sign "—" represents the INVERT operator.

At the end of each cycle 1 to 4, the signals on lines 106-1 to 106-4 are provided to the stages 82-1 to 82-4 of MASK register 82, respectively, through bus 99. The content of MASK register 82 is reset at cycle 5.

Also, the signals on lines 106-1 to 106-4 are used to update the BASIC and COMPLEMENTARY matrices at cycle 1 and the COMPLEMENTARY matrix at cycles 2 to 4. To perform this function the signals on lines 106-1 to 106-4 are gated by a gate 108 at the appropriate times to be provided to the BASIC and/or COMPLEMENTARY matrices as the case may be.

The signals on lines 106-1 to 106-4 are provided to decoding and gating circuit 102, which also receives the address of the currently processed row of the request matrix 36, from the address bus 75.

Logic circuit 102 causes the addresses of the selected units to be written in next target unit address register and next origin address register 52 and 54, through busses 96 and 98.

Figure 6:
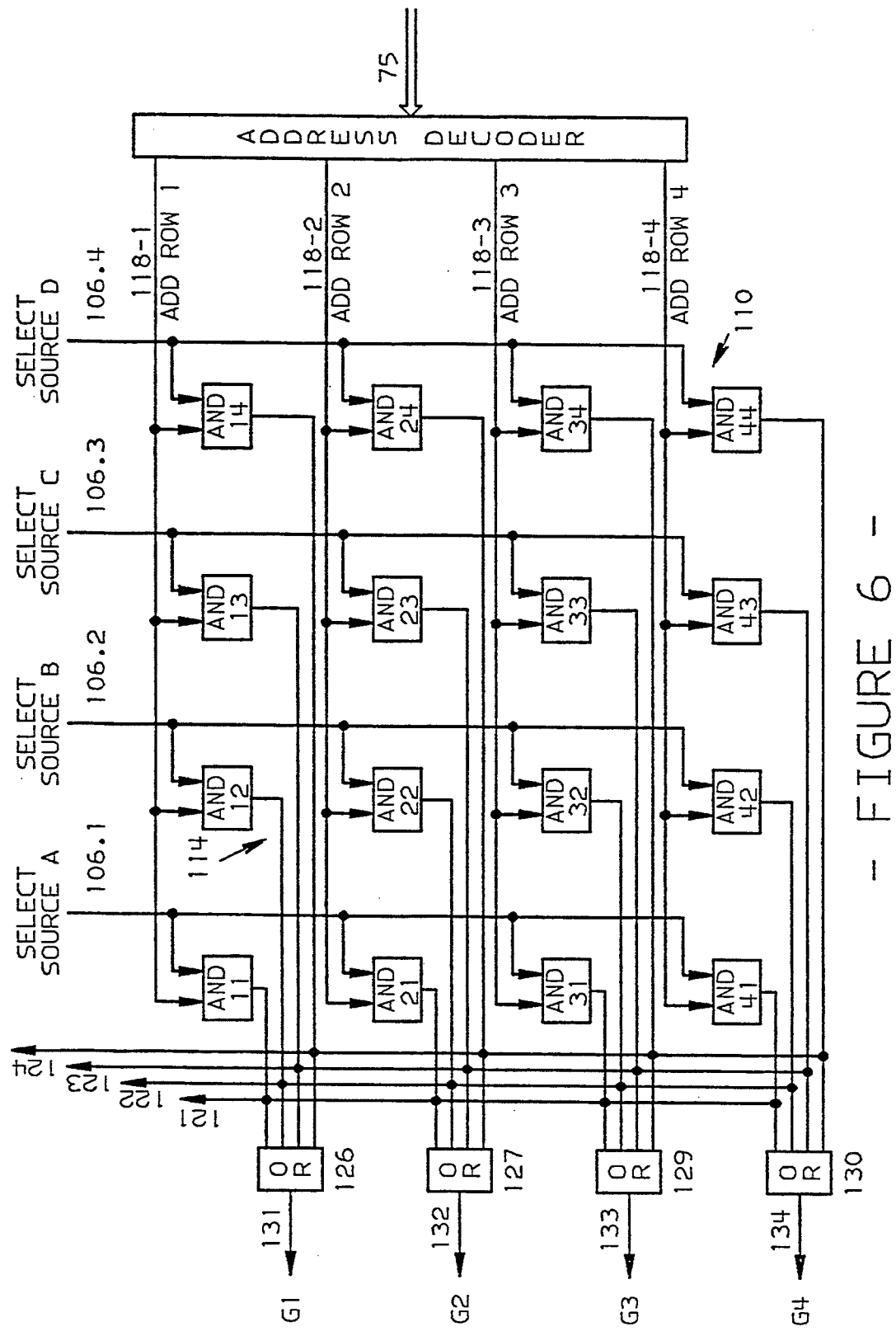
FIG. 6 represents the decoding logic circuit 110 which is a part of the decoding and gating logic circuit 102 shown in FIG. 5.
Figure 7:
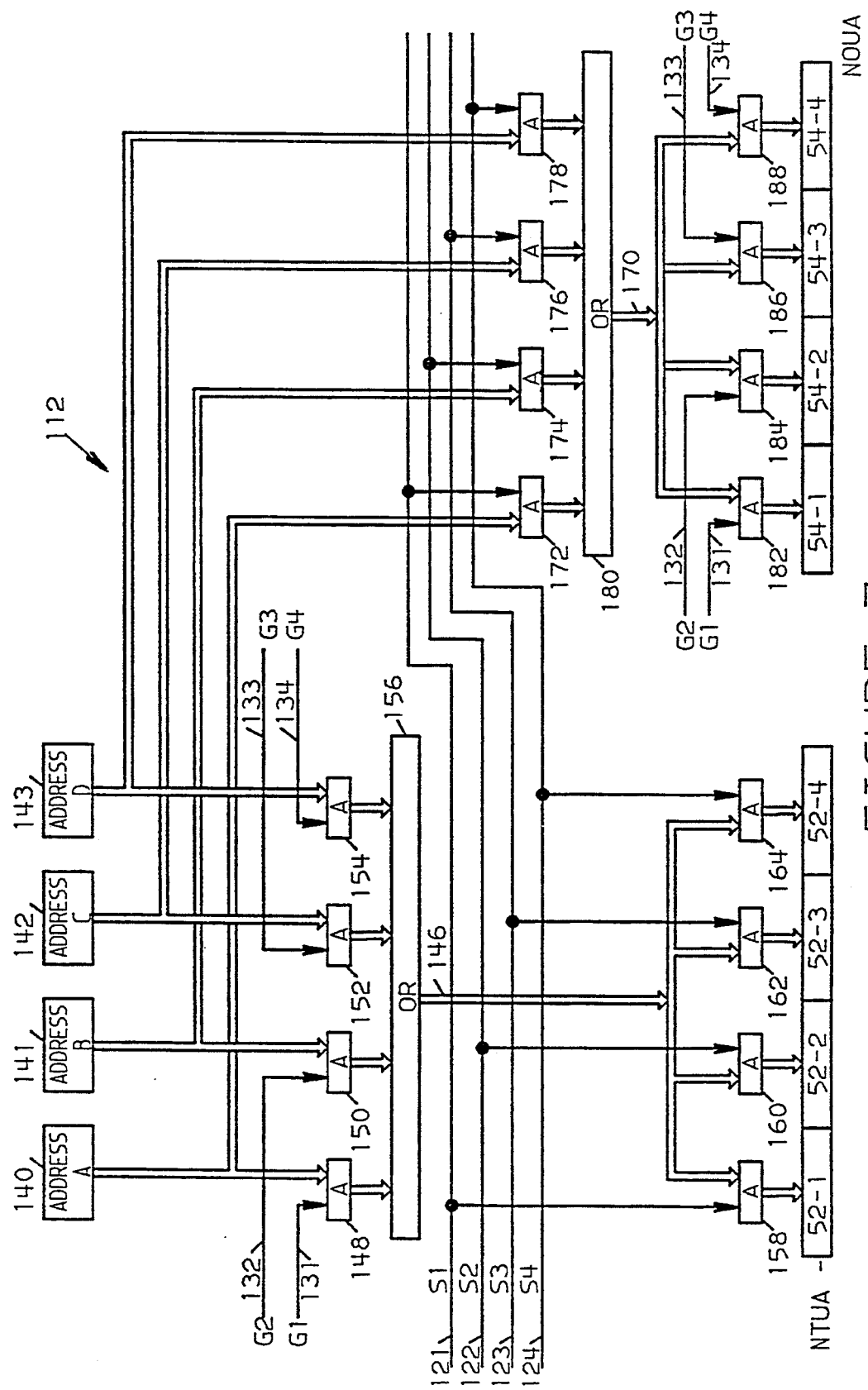
FIG. 7 represents the decoding and gating logic circuit 112 which is a part of the decoding and gating logic circuit 102 shown in FIG. 5.

FIG. 6 shows the decoding logic circuit 110 and FIG. 7 shows the gating logic circuit 112.

Decoding logic circuit 110 comprises a matrix of 16 AND gates 114-ij, where i and j represent the row an column numbers of the matrix.

The address of the currently processed row is provided from bus 75 to decoder 116, which activates one of its output lines 118-1 to 118-4 depending which row address is decoded. Line 118-1 is activated when the address of row 1 is decoded, line 118-2 is activated when the address of row 2 is decoded, etc.

The AND gates 114-11 to 114-14 in the first row of matrix 114, are conditioned by the active signal on line 118-1.

The AND gates 114-21 to 114-24 in the second row of matrix 114, are conditioned by the active signal on line 118-2.

The AND gates 114-31 to 114-34 in the third row of matrix 114, are conditioned by the active signal on line 118-3.

The AND gates 114-41 to 114-44 in the fourth row of matrix 114, are conditioned by the active signal on line 118-4.

The SELECT SOURCE A signal on line 106-1 is provided to the four AND gates 114-11, 114-21, 114-31 and 114-41 in the first column of the AND gate matrix.

The SELECT SOURCE B signal on line 106-2 is provided to the four AND gates 114-12, 114-22, 114-32 and 114-42 in the second column of the AND gate matrix.

The SELECT SOURCE C signal on line 106-3 is provided to the four AND gates 114-13, 114-23, 114-33 and 114-43 in the third column of the AND gate matrix.

The SELECT SOURCE D signal on line 106-4 is provided to the four AND gates 114-14, 114-24, 114-34 and 114-44 in the fourth column of the AND gate matrix.

Thus, at each cycle, an active signal is provided at the output of one AND gate 114-ij, except when no selection is possible. This active signal indicates which pair of units is to be selected.

For example an active signal at the output of AND gate 114-23 indicates that the selected origin unit is C and the selected target unit is B.

The outputs of AND gates 114-11 to 114-41 in the first column are dot ORed on line 121, the outputs of AND gates 114-12 to 114-42 in the second column are dot ORed on line 122, the outputs of AND gates 114-13 to 114-43 in the third column are dot ORed on line 123 and the outputs of AND gates 114-14 to 114-44 in the fourth column are dot ORed on line 124.

The outputs of AND gates 114-11 to 114-14 in the first row are connected to OR gate 126, the outputs of AND gates 114-21 to 114-24 in the second row are connected to OR gate 127, the outputs of AND gates 114-31 to 114-34 in the third row are connected to OR gate 128 and the output of AND gates 114-41 to 114-44 are connected to OR gate 129.

Thus, gating signals S1 to S4 are generated on lines 121 to 124 and gating signals G1 to G4 are generated on the output lines 132 to 134 of OR gates 126 to 129. These signals are provided to gating logic circuit 112 shown in FIG. 7.

Gating circuit 112, gates the address of the selected units into registers NTUA 52 and NOUA 54.

The addresses of units A, B, C, and D are stored in registers 140, 141, 142 and 143 respectively, and they are gated into positions of registers 52 and 54 as a function of the selected pairs of units as indicated in the following table 3.

TABLE 3

|  | NTUA 52 | | | | NOUA 54 | | | |
| --- | --- | --- | --- | --- | --- | --- | --- | --- |
|  | 52-1 | 52-2 | 52-3 | 52-3 | 54.1 | 54.2 | 54.3 | 54.4 |
| A −> A |  |  |  |  |  |  |  |  |
| G1.S1 = 1 | A |  |  |  | A |  |  |  |
| B −> A |  |  |  |  |  |  |  |  |
| G1.S2 = 1 |  | A |  |  | B |  |  |  |
| C −> A |  |  |  |  |  |  |  |  |
| G1.S3 = 1 |  |  | A |  | C |  |  |  |
| D −> A |  |  |  |  |  |  |  |  |
| G1.S4 = 1 |  |  |  | A | D |  |  |  |
| A −> B |  |  |  |  |  |  |  |  |
| G2.S1 = 1 | B |  |  |  |  | A |  |  |
| B −> B |  |  |  |  |  |  |  |  |
| G2.S2 = 1 |  | B |  |  |  | B |  |  |
| C −> B |  |  |  |  |  |  |  |  |
| G2.S3 = 1 |  |  | B |  |  | C |  |  |
| D −> B |  |  |  |  |  |  |  |  |
| G2.S4 = 1 |  |  |  | B |  | D |  |  |
| A −> C |  |  |  |  |  |  |  |  |
| G3.S1 = 1 | C |  |  |  |  |  | A |  |
| B −> C |  |  |  |  |  |  |  |  |
| G1.S2 = 1 |  | C |  |  |  |  | B |  |
| C −> C |  |  |  |  |  |  |  |  |
| G1.S3 = 1 |  |  | C |  |  |  | C |  |
| D −> C |  |  |  |  |  |  |  |  |
| G1.S4 = 1 |  |  |  | C |  |  | D |  |
| A −> D |  |  |  |  |  |  |  |  |
| G2.S1 = 1 | D |  |  |  |  |  |  | A |
| B −> D |  |  |  |  |  |  |  |  |
| G2.S2 = 1 |  | D |  |  |  |  |  | B |
| C −> D |  |  |  |  |  |  |  |  |
| G2.S3 = 1 |  |  | D |  |  |  |  | C |
| D −> D |  |  |  |  |  |  |  |  |
| G2.S4 = 1 |  |  |  | D |  |  |  | D |

One of the unit addresses stored in registers 140 to 144 is gated on bus 146 under control of the active signal G1, G2, G3 or G4 on lines 131, 132, 133 or 134 through AND gate arrangements 148, 150, 152 and 154 and OR gate 156. Bus 146 is connected to the inputs of AND gate arrangements 158, 160, 162 and 164 so that the address of unit A, B, C, or D is gated into one selected position 52-1 to 52-4 of register 52 under control of the active signal on line 121, 122, 123 or 124.

One of the unit addresses stored in registers 140 to 144 is gated on bus 170 under control of the active signal S1, S2, S3 or S4 on lines 121, 122, 124 of 124 through AND gate arrangements 172, 174 176 and 178 and OR gate 180.

Bus 170 is connected to the inputs of AND gate arrangements 182, 184, 186 and 188, so that the address of unit A, B, C or D is gated into one selected position 54-1 to 54-4 of register NOUA 54 under control of the active signal G1, G2, G3 or G4 on line 131, 132, 133 or 134.

As previously described, the preferred embodiment of the invention makes use of a processor running a selection algorithm which gives each unit an equal probability of being selected within a given time, thanks to the request matrix 46, the mask register 82 and the remembrance matrices 70 and 72. It will be obvious for the man skilled in the art to change the processor so that it may run a simpler algorithm which only insures that the maximum number of different pairs of units is determined during each burst time. Such a simpler implementation does not require the provision of remembrance matrices.

What is claimed is:

1. A system for performing transfers of data packets between pairs of data processing units connected by parallel busses in a non-serial communications network comprising an origin unit and a target unit selected among N data processing units (8), each data processing unit comprising a set of outbound queues with one outbound queue associated with each one of the data processing units to which it may send data packets, for storing the data packets to be sent by the data processing unit to the data processing unit associated with said one outbound queue, said system characterized in that it comprises:

clocking means (44) providing timing signals for defining burst times Ti, of fixed durations;

centralized selecting means (4) active during each burst time Ti for selecting different pairs of units as a function of transfer requests received from the N data processing units, with each unit being selected as an origin unit and a target unit only once during said each burst time Ti;

said centralized selecting means comprising sending means (56, 14) for sending the address of the selected target unit of each pair to the origin unit of the pair;

a receive data bus (20) and a transmit data bus (18) connected in parallel to each origin unit and each target unit; and data switching means (6) connected to each one of the N data processing units by the receive data bus (20) and the transmit data bus (18); said data switching means responsive to the addresses of the selected target units received from the selected origin unit to connect, during the next burst time Ti+k, k being an integer number higher than or equal to 1, the transmit data bus of the origin unit to the receive data bus of the target unit of each pair selected during the burst time Ti, whereby data packets are simultaneously transferred from the outbound queues in the selected origin units to the selected target units.

2. A system according to claim 1 characterized in that the burst times Ti comprises at least N cycles and, the centralized selecting means (4) are active during the N first cycles of each burst time Ti for conditionally selecting a pair of units during each cycle 1 to N, firstly, as a function of the transfer requests received from the N data processing units, with units selected as origin and target units during a given cycle of a predetermined burst time not being selected as origin and target units during the other cycles of the same predetermined burst time, secondly, during the first cycle, as a function of the pair of units selected during the first cycle of the previous burst time Ti-N, the pair of units selected during said last named first cycle not being selected during said first named first cycle unless no other pair may be selected, thirdly, during the second to Nth cycles, as a function of the pairs of units selected during the third to Nth and first cycles of the next preceding burst time, respectively, the pairs of units selected during the third to Nth and first cycles of the next preceding burst time not being selected during the second to Nth cycles of the current burst time Ti, respectively, unless no other pair of units may be selected.

3. A system according to claim 2, characterized in that the centralized selecting means comprise:

first storing means (36) receiving the transfer requests in the form of an information indicative of empty to not empty status changes of the outbound queues from the N data processing units (8) and comprising N sets (rows 1 to 4) of N storing positions, each one of said storing positions being assigned to a given data processing unit, the information indicative of the empty or not empty status, as the case may be, of the outbound queues associated with a given unit in the N units being stored in one set of storing positions, second storing means (50) for storing the addresses of the units of the pairs which are selected during each cycle of the burst times, addressing means (70) responsive to the timing signals from the clocking means (44) for successively addressing a set of the storing positions in the first storing means during the successive cycles 1 to N of a current burst time Ti and addressing the second storing means so as to get the addresses of the pairs selected in the cycles 1 of the burst time Ti-4 and in the cycles 3 to N and 1 of the next preceding burst time Ti-1, selection processing means (46, 52, 54) which are responsive to the information read from the first and second storing means when addressed by the addressing means for determining the addresses of the origin and target units of the pair which may be conditionally selected during each cycle 1 to N of the current burst time Ti and for providing these addresses to the sending means (56).

4. A system according to claim 3, characterized in that the first storing means (36) comprise a first matrix (36) having N rows and N columns, the N rows of the matrix constituting the N sets of N storing positions, so that at each cycle 1 to N one row of the first matrix is addressed by the addressing means and the content of the addressed row is read and provided to the selection processing means, the address of the row being indicative of the target unit of the pair, the origin unit of which will be conditionally selected by the selection processing means.

5. A system according to claim 3, characterized in that each burst time Ti comprises at least N+1 cycles and the addressing means comprises modulo-N counting means (74) responsive to the timing signals for providing at each cycle 1 of a current burst time Ti, the address of a first row (Row i), said address being then incremented by one at each following cycles 2 to N to generate successive row addresses, the content of the rows having the addresses provided by the counting means at cycles 1 to N being read and provided to the selection processing means during the cycles 1 to N, and the last address generated at cycle N being incremented at cycle N+1 in such a way that the first address provided by the counting means (74) at cycle 1 of the following burst time Ti+1 be equal to the address of the first row provided at cycle 1 of the burst time Ti plus one.

6. A system according to claim 5, characterized in that the second storing means comprise a second matrix (70) and a third matrix (72), each one having N rows, one row of the second matrix being addressed during the first cycle of each current burst time Ti by the address generated by the counting means during this cycle, to provide the address of a unit selected as origin unit during the first cycle of the burst time Ti-4 to the selection processing means, the address of the origin unit, if any, which is selected during the first cycle of the current burst time Ti being written in the so addressed row of the second matrix, one row of the third matrix being addressed during each cycle 1 to N of each current burst time Ti by the address generated by the counting means, to provide during each cycle 2 to N of the current burst time Ti, the address of the origin unit selected during each cycle 3 to N and 1 of the previous burst time Ti-1, the address of the origin unit, if any, which is selected during each cycle 1 to N of the current burst time being written into the so addressed row of the third matrix.

7. A system according to claim 3 characterized in that the selection processing means further comprises:

masking means (82, 83 and 84) having an output bus (88), said masking means receiving at each cycle 1 to N of a current burst time Ti, the information read from the N storing positions of the addressed row of the first storing means and a masking pattern for generating a masked row pattern on the output bus (88), at each cycle 1 to N, selection means (90) receiving the masked row pattern at each cycle 1 to N, the unit address contained in the second matrix row addressed at cycle 1 and the unit address contained in the second third matrix row addressed at cycles 2 to N, to conditionally select a pair of units during each cycle 1 to N and update the masking pattern as a function of the selected origin unit to prevent a unit from being selected as origin unit more than one time during the current burst time.

8. A system according to any one of claims 3 to 7 characterized in that the selection processing means comprise a first and a second register means, (52 and 54) each one having N positions, with one position being associated to a corresponding one data processing unit, the selection means providing at each cycle 1 to N of a current burst time Ti, in the position of the first register means corresponding to the origin unit of the selected pair, the address of the target unit of the pair and in the position of the second register means corresponding to the target unit of the selected pair, the address of the origin unit, the content of the positions of the first and second register means corresponding to the same units being provided to the sending means.

9. A system according to claim 8 characterized in that the sending means (56,14) comprise serializing means (56) which receive the address information provided by the first and second register means, and send them in series to the respective units.

10. A system according to claim characterized in that each data processing unit (8) comprises:

a plurality of N inbound queues, each one of said inbound queue being associated to each one of said data processing unit and means (32) which are responsive to the origin addresses received from the second register means to cause the data received by the unit to be stored into the corresponding inbound queue.

11. A system for performing transfers of data packets between pairs of data processing units connected by parallel bus systems in a non-serial communications network comprising an origin unit and a target unit selected among N data processing units (8), each data processing unit comprising a set of outbound queues with one outbound queue associated with each of the data processing units to which it may send data packets, for storing the data packets to be sent by the data processing unit to the data processing unit associated with said one outbound queue, said system being characterized in that it comprises:

clocking means (44) providing timing signals for defining burst times Ti;

centralized selecting means (4) active during each burst time Ti for selecting different pairs of units as a function of transfer requests received from the N data processing units with each unit being selected as an origin unit and a target unit, only once during said each burst time Ti and for sending the address of the selected target unit of each pair to the origin unit of the pair;

a transmit data bus and a receive data bus arranged in parallel for connecting to each of the data processing units; and data switching means (6) connected to each one of the transmit data bus and the receive data bus; said data switching means responsive to the address of the selected target unit received from the selected origin unit to connect the transmit data bus of the origin unit to receive data bus of the target unit of each pair selected during the burst time Ti, so that data packets are simultaneously transferred from the outbound queues in the selected origin unit to the selected target unit.

12. A system according to claim 11 characterized in that the burst times Ti comprises at least N cycles and, the centralized selecting means (4) is active during the N first cycles of each burst time Ti for conditionally selecting a pair of units during each cycle 1 to N, firstly, as a function of the transfer requests received from the N data processing units, with units selected as target units during a given cycle of a predetermined burst time not being selected as target units during the other cycles of the same predetermined burst time, secondly, during the first cycle, as a function of the target unit selected during the first cycle of the previous burst time Ti-N, the target unit selected during said last named first cycle not being selected during said first named first cycle unless no other target unit may be selected, thirdly, during the second to Nth cycles, as a function of the target unit selected during the third to Nth and first cycles of the next preceding burst time, respectively, the target unit selected during the third to Nth and first cycles of the next preceding burst time not being selected during the second to Nth cycles of the current burst time Ti, respectively, unless no other target unit may be selected.

* * * * *